(12) United States Patent
Metivier

(10) Patent No.: US 8,591,197 B2
(45) Date of Patent: Nov. 26, 2013

(54) METHOD OF FABRICATING A SPAR FOR A ROTORCRAFT BLADE

(75) Inventor: Remi Metivier, Paris (FR)

(73) Assignee: Eurocopter, Marignane Cedex (FR)

( * ) Notice: Subject to any disclaimer, the term of this patent is extended or adjusted under 35 U.S.C. 154(b) by 224 days.

(21) Appl. No.: 13/273,306

(22) Filed: Oct. 14, 2011

(65) Prior Publication Data

US 2012/0031544 A1 Feb. 9, 2012

Related U.S. Application Data

(62) Division of application No. 12/357,539, filed on Jan. 22, 2009, now Pat. No. 8,061,991.

(30) Foreign Application Priority Data

Jan. 25, 2008 (FR) ..................................... 08 00383

(51) Int. Cl.
*B23K 5/08* (2006.01)

(52) U.S. Cl.
USPC ..................... 416/241 R; 416/141

(58) Field of Classification Search
USPC .......... 416/103, 134 A, 138, 141, 155, 223 R, 416/229 R, 241 R
See application file for complete search history.

(56) References Cited

U.S. PATENT DOCUMENTS

| | | | |
|---|---|---|---|
| 3,713,753 A | 1/1973 | Brunsch | |
| 3,923,422 A | 12/1975 | Ianniello et al. | |
| 4,083,650 A | 4/1978 | Zboril | |
| 4,339,230 A | 7/1982 | Hill | |
| 4,935,277 A | 6/1990 | Le Balc'h | |
| 7,037,076 B2 | 5/2006 | Jacot et al. | |
| 7,040,863 B2 * | 5/2006 | Guimbal | 416/134 A |
| 8,061,991 B2 * | 11/2011 | Metivier | 416/155 |
| 8,128,367 B2 * | 3/2012 | Enenkl et al. | 416/103 |
| 2004/0247436 A1 | 12/2004 | Guimbal | |
| 2005/0042109 A1 | 2/2005 | Kovalsky et al. | |
| 2009/0010764 A1 | 1/2009 | Parisy et al. | |
| 2009/0155086 A1 | 6/2009 | Parisy et al. | |
| 2010/0266416 A1 | 10/2010 | Marshall et al. | |
| 2010/0303630 A1 | 12/2010 | Gandhi | |

FOREIGN PATENT DOCUMENTS

FR 2030036 10/1970

\* cited by examiner

*Primary Examiner* — Michael Lebentritt
(74) *Attorney, Agent, or Firm* — Brooks Kushman P.C.

(57) ABSTRACT

A method of forming a rotorcraft blade is provided. A first support shaft (8) is secured to a rigid attachment filler (1) of the blade that is reversibly fastened to a mandrel (20). Fibers are placed around the assembly comprising said attachment filler (1) and said mandrel (20) in order to fabricate a spar of said blade, said spar (40) then including a succession of fiber layers (31, 32, 33) that hold said attachment filler (1) captive at the root (51) of said blade. Said first shaft (8) is removed after the spar has polymerized.

8 Claims, 1 Drawing Sheet

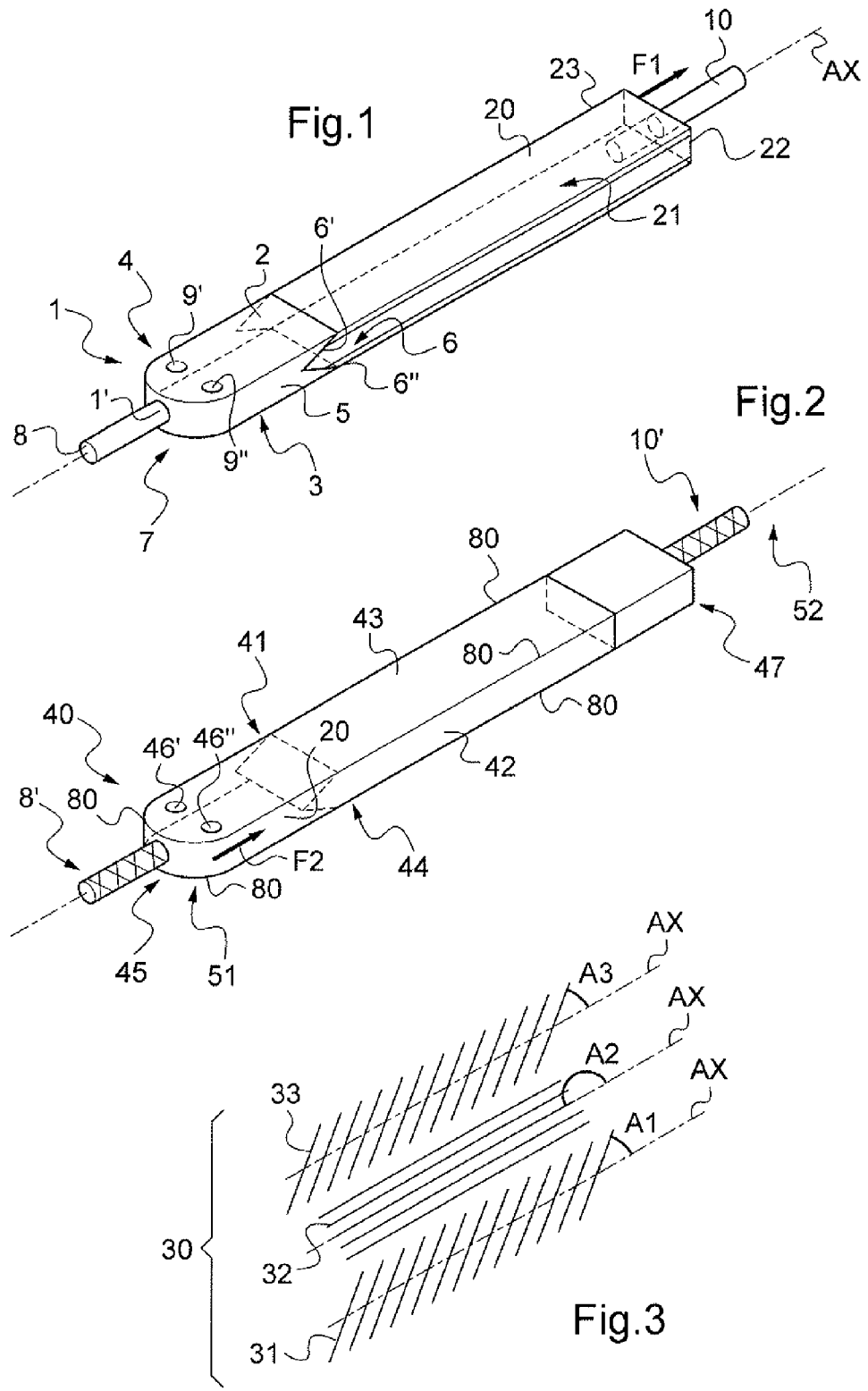

METHOD OF FABRICATING A SPAR FOR A ROTORCRAFT BLADE

CROSS-REFERENCE TO RELATED APPLICATIONS

This application is a division of U.S. application Ser. No. 12/357,539 filed Jan. 22, 2009, which claims priority to French Application No. 08 00383 filed Jan. 25, 2008 the disclosures of which are incorporated in their entirety by reference herein.

TECHNICAL FIELD

The present invention relates to a method for fabricating a spar for a rotorcraft blade, the spar incorporating a fastener attachment.

The invention thus lies in the technical field of rotorcraft blades.

BACKGROUND

A rotorcraft is provided with at least one engine that drives a main rotor serving to provide the aircraft with lift and also with propulsion. The rotor comprises a hub that is rotated by a rotor shaft driven by the engine, and a plurality of blades are arranged on the hub.

During their rotary motion, the blades are subjected to a torser of forces and consequently they are subjected to a centrifugal force and also to multiple effects due to flapping, drag, and twisting, where twisting is caused in particular by changes of pitch seeking to modify the angle of inclination of the blades relative to the plane of the hub.

Furthermore, the hub generally has a plurality of arms that are possibly flexible in flapping and that have the blades arranged at the ends thereof. The forces due in particular to centrifugal force are then transmitted by the blade to the non-flexible central zone of the hub.

A first type of method consists in fabricating a blade body and then in fastening the body to the rotor hub via specific fastener attachments.

Documents FR 2 874 852, FR 2 321 997, EP 0 011 330, and FR 2 518 979 describe a plurality of techniques enabling a blade body to be fabricated by winding or braiding composite materials.

It is then appropriate to secure the blade body to a fastener attachment.

According to document FR 2 030 036, for example, winding is used to make a cylindrical element that is to constitute the outer covering of the blade. The cylindrical element is then cut longitudinally into two subassemblies, each subassembly then being placed in a mold.

The spar of the blade is also made by winding. The spar comprises a first block of fiber layers presenting an angle of 45° relative to the longitudinal axis of the blade, and then a second block of fiber layers presenting an angle of 30° relative to said longitudinal axis, and finally a third block of fiber layers presenting an angle of 15° relative to the longitudinal axis.

The spar opens out to the outside at the root of the blade via an opening, and a wound attachment is wedged in said opening, and then secured to the rotor hub. Thereafter, the blade is terminated by inserting the spar between the two molds in which the two subassemblies for the outer coating of the blade are placed.

The blade then transmits the forces to which it is subjected to the hub, successively via its spar and its fastener attachment.

That method of fabrication is effective, but nevertheless limited.

Fabrication time is lengthy since numerous steps are implemented, thereby clearly leading to excessive costs.

It is also possible to observe defects at the blade root, since the fastener attachment is liable to move relative to the spar.

A second type of method consists in securing the fastener attachment to the blade spar during fabrication of the spar, and not subsequently.

Document U.S. Pat. No. 3,923,422 describes such a technique.

At the blade root, the spar is wound around a fastener attachment that has a vertical axis substantially parallel to the axis of rotation of the rotor.

Nevertheless, in order to make the vertical winding, the spar needs to be twisted. Such twisting through about ninety degrees presents the drawbacks of possibly being destructive insofar as a spar for a composite material blade is constituted mainly by unidirectional fiber tapes.

Furthermore it is difficult for the unidirectional tapes that come from the twisted section of the distributed spar to be placed flat against the suction and pressure sides of the blade.

Twisting can then lead to poor reproducibility from one blade to another both in terms of shape and also of mechanical and vibrational characteristics.

Furthermore, if it is necessary to arrange filler elements in the blade, they must be of shape that is complex and they will vary from one blade to another since the twisting of the spar is not reproduced identically. It then becomes difficult to automate blade fabrication.

In addition, the problem of anchoring the fastener attachment remains.

It is then possible to envisage winding the spar "horizontally", in accordance with the proposal described in document EP 0 657 646.

According to that document, the blade is provided with a metal fastener attachment at its blade root and with a metal fitting at its free end.

The fastener attachment and the metal fitting are placed in clamping heads of a winder machine. Unidirectional fibers are then wound horizontally around the fastener attachment and the metal fitting. Those fibers are thus substantially parallel to the longitudinal axis of the blade and they are capable of taking up the centrifugal forces that are exerted on the blade.

The winder machine then lays sheets of crossed-fibers between the fastener attachment and the metal fitting.

Front and rear streamlined elements are then put into place and covered in a sheet of crossed-fibers.

Consequently, it remains possible for the fastener attachment to move along a transverse axis that is perpendicular to the longitudinal axis of the blade, and that can lead to the blade being rejected.

SUMMARY

An object of the present invention is thus to propose a blade that is easy to manufacture and that is reproducible, the blade also guaranteeing high quality anchoring of its fastener attachment.

According to the invention, a rotorcraft blade is provided with a rigid attachment filler and with a spar that extends along the span of the blade, from a root of the blade towards a free end of the blade, the attachment filler having top, bottom, front, rear, left side, and right side faces. The blade is remarkable in that the spar includes a succession of fiber layers that hold the attachment filler captive at the blade root, the spar being secured to the top, bottom, front, rear, and left side faces of the attachment filler.

The attachment filler that represents the fastener attachment of the blade is intimately bonded with the spar and does not run any risk of separating therefrom.

By being wound thereabout, the spar guarantees that the attachment filler is anchored faultlessly.

In addition, it is explained below that the blade is easy to manufacture since it suffices to place the fibers constituting the spar around the attachment filler and a mandrel, e.g. by winding or by braiding.

The blade also possesses one or more of the following additional characteristics.

Firstly, said spar has top, bottom, front, rear, and end portions secured respectively to the top, bottom, front, rear, and left side faces of said attachment filler.

The spar surrounds the attachment filler and adheres to the filler so as to guarantee that it is anchored. The attachment filler is thus secured to the spar, e.g. by adhesive bonding.

Preferably, said end portion is concave, its concave side facing the free end of the blade, remote from its root.

The spar then represents a kind of tube that accurately matches the profile of the blade and that is terminated by an end at the blade root so as to retain the attachment filler easily. At its opposite end, the spar may optionally be open beside the free end of the blade.

At the blade root, the spar is hemispherical in shape, being truncated so as to be substantially plane beside the suction and pressure sides of the blade.

It should be observed that the very particular and novel shape of the spar at the blade root contributes surprisingly to good transmission of forces, and in particular of centrifugal forces.

Furthermore, it is advantageous for the spar to present rounded edges between its various portions so as to avoid creating sharp edges that might damage the fibers of the spar during fabrication thereof.

In a variant of the invention, said spar is a wound spar, said succession of layers consisting in a stack of layers of fibers, glass fibers, for example.

Said succession comprises at least one stack having first, second, and third fiber layers respectively presenting first, second, and third angles relative to a longitudinal axis, said first and third angles lying in the range 15° to 90°, and said second angle lying in the range 0° to 15°.

Unlike a conventional spar having a first reinforcing block extending generally longitudinally for taking up centrifugal and flapping forces of the blade and a second reinforcement block designed to take up drag and twisting forces, the spar of the invention possesses a succession of layers presenting different angles.

Thus, the second layer is adapted to transmitting centrifugal forces and flapping forces to the rotor hub, while the first and third layers are more suitable for transmitting drag and twisting forces.

Surprisingly, it has been found that by making the fiber layers in discrete manner in this way so as to build up a particular stack, an almost isotropic structure is obtained that is stronger and sounder than are conventional structures.

Similarly, the density of the fiber layers, i.e. their weight per unit area, can vary from one layer to another and also as a function of span position along the blade. Consequently, the blade can be well optimized as a function of the forces that it needs to withstand, the fibers being distributed in a highly accurate manner so as to limit the weight of the blade.

Finally, both the spar and the attachment filler include at least one respective passage, respectively a hole and an orifice in register with each other, for insertion of a pin for fastening the blade to the hub of a rotor.

Consequently, at the root of the blade, the fibers of the second layer are trapped in the hemispherical shape of the spar and serve to transmit centrifugal forces.

The end portion of the spar then exerts forces on the attachment filler, these forces subsequently being transmitted by pressing against the fastener pins extending through the blade. The pins thus tend to flatten the filler and the spar.

In addition, by going round the rear of the blade root, the longitudinal fibers of the second layer provide mechanical anchoring of the attachment filler.

The present invention also seeks to provide a method enabling a rotorcraft blade as described above to be fabricated easily.

The method of fabricating a rotorcraft blade of the invention is remarkable in that the following steps in particular are performed in succession to fabricate the blade spar:

a) a first support shaft is secured to a rigid attachment filler of the blade that is reversibly fastened to a mandrel via an engagement system;

b) fibers are placed around the assembly comprising said attachment filler and said mandrel in order to fabricate a spar of said blade, said spar then including a succession of fiber layers that hold said attachment filler captive at the root of said blade; and c) said first shaft is removed after the spar has polymerized.

Once the spar and the associated fastener attachment, i.e. the attachment filler, have been completed, it suffices to put any filler elements and an outer coating into place in order to terminate the blade, and this can be done using proven techniques.

Alternatively, the spar and its incorporated attachment can be placed inside a hollow coating.

It can be seen that fabricating the blade is then very simple, easily reproducible, and quick to implement, thereby satisfying the problem posed.

The method may include one or more of the following additional manipulations.

Firstly, during step c), it is possible to cut off a distal end of the spar, i.e. the distal end of the spar remote from the attachment filler, in order to remove the mandrel.

Depending on requirements, it is not necessarily essential to conserve an element inside the spar. Consequently, by cutting off its distal end, it becomes possible to separate the mandrel from the attachment filler in order to remove the mandrel.

Secondly, while winding the fibers that constitute the spar, the first shaft enables the assembly comprising the attachment filler and the mandrel to be held relative to the machine performing said winding.

Thus, fibers are wound in sequence around said assembly, from the blade root to the distal end of the spar, and they are covered in serving at the blade root.

More precisely, the fibers are also wound around the first support shaft which then also acts as a mechanical stop.

At the end of step c), during a trimming stage following polymerization of the spar, attention is directed to the first shaft. Since a portion of the first shaft projects from the attachment filler, the first shaft is removed with the help of a conventional mechanical system and then the fibers that used to cover the projecting portion of the first shaft are cut away.

During a step d), the spar is pierced in register with the attachment filler so as to be able to pass at least one pin for fastening the blade to a rotor hub.

Similarly, prior to step a), at least one orifice is made in the attachment filler so as to be in register with the piercing formed during step d).

The orifice formed in the attachment filler and the corresponding piercing of the spar thus enable a fastener pin to be passed through.

If the orifice in the filler is covered by the outer coating of the blade, it can readily be understood that the coating is pierced in order to uncover said orifice.

Furthermore, in a first implementation, the mandrel is a meltable mandrel. Thus, for the mandrel having a rigid core surrounded by a meltable zone in turn covered by an inflatable bag, said meltable zone is destroyed at least in part during an intermediate step b') between steps b) and c), in order to be able to remove the mandrel subsequently.

This step b') can occur while the spar is being cured in a mold provided for this purpose.

In a second implementation, the mandrel is a permanent mandrel designed to remain within the spar. The permanent mandrel is made of a material presenting low density, e.g. foam.

Finally, if the blade is of considerable length, during step a), the mandrel is secured to a second support shaft. Optionally, the first and second support shafts are secured to each other and constitute a single, common support shaft.

BRIEF DESCRIPTION OF THE DRAWINGS

The invention and its advantages appear in greater detail from the following description of an embodiment given by way of illustration with reference to the accompanying figures, in which:

FIG. 1 is a diagrammatic view explaining step a) of the method of the invention;

FIG. 2 is a diagrammatic view explaining step b) of the method of the invention; and FIG. 3 is a view showing a stack in the invention.

Elements present in more than one figure are given the same references in each of them.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIG. 1, an operator makes an attachment filler, e.g. out of composite materials, the filler having a top face 2, a bottom face 3, a front face 4, a rear face 5, a right side face 6, and a left side face 7.

When the blade fitted with this attachment filler 1 is arranged on the hub of a rotor, the left side face 7 is the face of the attachment filler 1 closest to the axis of rotation of the hub, while the right side face 6 is the face closest to the free end of the blade, i.e. the end of the blade opposite from the blade root.

The attachment filler 1 is pre-pierced so as to have orifices 9', 9" passing right through it, each orifice opening out into the top face 2 and the bottom face 3. These orifices 9', 9" receive the fastener pins enabling the blade fitted with the spar to be fastened to the hub of a rotor.

The orifices 9', 9" may optionally contain conventional fastener bushings.

Similarly, the attachment filler has an opening 1' to enable it to be secured to a first support shaft 8.

The right side face 6 of the attachment filler includes an engagement system for engaging a mandrel 20. More precisely, the right side face 6 has two inclined planes 6', 6" with the mandrel 20 being wedged between them.

Because of these inclined planes, the shape of the right side face 6 enables the attachment filler 1 to present thickness that tapers in register with the mandrel 20. This shape thus guarantees variation in stiffness that is advantageously progressive and not sudden.

It should be observed that it is possible to design other tapering shapes, for example implementing a right side face that comprises a single inclined plane.

It can be understood that the fastening of the mandrel 20 to the attachment filler 1 is reversible, it being possible to disengage the mandrel 20 from the attachment filler 1 when an operator pulls the mandrel 20 in the direction of arrow F1.

Furthermore, in the first embodiment as shown in FIG. 1, the mandrel 20 has a rigid central core 21 that is secured to a retractable meltable zone 22, e.g. made of polystyrene or of soluble materials.

This retractable zone 22 is then covered in an inflatable bag 23.

In a second embodiment (not shown in the figures), it is not essential to use a mandrel that can be removed after the spar has been fabricated. If the mandrel is made out of a material that presents low density, e.g. out of foam, then the mandrel presents relatively small weight and may therefore be retained. Under such circumstances, the mandrel comprises no more than a low density rigid core.

Furthermore, during a step a) of the method of the invention, a first support shaft 8 is secured to the attachment filler 1 by being placed in the opening F.

Similarly, a second support shaft 10 is secured to the rigid core 21 of the mandrel 20.

These support shafts enable the assembly comprising the attachment filler 1 and the mandrel 20 to be arranged on a device for laying winding or braiding fibers.

As a variant, the first and second support shafts could constitute the ends of a single support shaft that passes right through the attachment filler 1 and the mandrel 20.

The single support shaft could also represent the rigid core of the meltable mandrel 20.

With reference to FIG. 2, during a step b) that follows the step a), the fiber-laying device lays fibers, e.g. by winding them, around the assembly, i.e. around both the attachment filler 1 and the mandrel 20 so as to build up the spar 40 that extends from the root 51 of the blade towards a distal end 47 situated close to the free end 52 of the blade.

The spar 40 then comprises a succession of fiber layers that hold the attachment filler 1 captive at the root 51 of the blade, i.e. they surround it.

Consequently, the spar 40 completely contains the assembly comprising the attachment filler 1 and the mandrel 20.

The top, bottom, front, rear, and end portions 43, 44, 41, 42, and 45 of the spar 40 are secured respectively to the top, bottom, front, rear, and left side faces 2, 3, 4, 5, and 7 of the attachment filler 1. By holding the filler captive in this way, it is clear that the spar 40 guarantees that the attachment filler is well anchored.

The fastening attachment of the blade, represented by the attachment filler, is then completely incorporated within the spar 40.

The fiber-laying device, and in particular the shape of the attachment filler 1 and of the mandrel, make it possible for the spar 40 to present edges 80 between the various portions, e.g. between its top portion 43 and its end portion 45.

These edges 80 are rounded so as to avoid damaging, or even cutting, the fibers.

At this stage, it is useful to observe that the fibers are also wound on the projecting portions 8' and 10' of the first and second support shafts.

Furthermore, the end portion 45 of the spar 40 is concave, with its concave side facing the free end 52 of the blade and not the blade root 51.

At the end of step b), during an intermediate step b'), the assembly comprising the attachment filler 1 and the fiber-covered mandrel 20 is placed in a heating mold.

Means for applying pressure are arranged against the second support shaft 10 in order to pressurize the inflatable bag 23.

It should be observed that the second support shaft 10 may include an opening through which there is slid the portion of the inflatable bag that is to be connected to the pressurizing means.

The fibers laid on the mandrel during step b) are then pressed against the mold in order to be shaped.

The stage of polymerizing the spar 40 is then begun. During curing, the heat causes the meltable zone 22 to retract.

At the end of polymerization, during a step c), an operator removes the first shaft 8 and then cuts through the fibers covering the projecting portion 8' of the first shaft 8.

Thereafter, the inflatable bag 23 is deflated and the distal end 47 is cut from the spar 40.

Since the volume of the meltable zone 22 has shrunk by a factor of 8 to 10, the inflatable bag 23 is no longer pressed against the top, bottom, front, and rear walls 43, 44, 41, and 42 of the spar 40. An operator can therefore disengage the mandrel 40 and extract it from inside the spar 40.

The spar 40 is therefore opened out beside the free end 52 of the blade.

Finally, the spar 40 is drilled in the vicinity of the blade root so as to obtain two holes 46' and 46" in register with the orifices 9' and 9" of the attachment filler.

It should be observed that the attachment filler 1 is not necessarily pre-drilled. Under such circumstances, the orifices 9' and 9" are made at the same time as the holes 46' and 46".

Pins for fastening the blades to the hub of a rotor can then pass through the spar 40.

In order to finish off fabrication of the blade, it suffices for example to place the spar 40 in a shaped outer covering using proven methods.

Consequently, it can be seen that the blade is easy to manufacture. The method to be applied is entirely reproducible, thereby guaranteeing that identical blades will be obtained.

Furthermore, the attachment filler of the blade is surrounded by the spar 40 and does not run any risk of becoming detached while the blade is in use.

With reference to FIG. 3, the fibers are laid on the attachment filler 1 and the mandrel 20 in such a manner as to form a succession of layers provided with at least one stack 30.

This stack comprises a first layer 31 of fibers of a first type presenting a first angle A1 relative to the longitudinal axis AX of the blade, i.e. the pitch variation axis of the blade, for example.

The first angle then lies in the range 15° to 90°.

This first layer is covered by a second layer 32 of fibers of a second type presenting a second angle A2 relative to the longitudinal axis AX of the blade, this second angle lying in the range 0° to 15°.

Finally, the second layer is covered in a third layer 33 of fibers, of the first type, presenting a third angle A3 relative to the longitudinal axis AX of the blade, the third angle lying in the range 15° to 90°.

A layer of the second type, i.e. having fibers that present an angle lying in the range 0° to 15° relative to the longitudinal axis AX, is thus arranged between two layers of the first type, i.e. having fibers presenting an angle lying in the range 15° to 90° relative to the longitudinal axis AX.

In a variant that is not shown in the figures, a layer of the first type, i.e. having fibers presenting an angle lying in the range 15° to 90° relative to the longitudinal axis AX, is arranged between two layers of the second type, i.e. layers provided with fibers presenting an angle lying in the range 0° to 15° relative to the longitudinal axis AX.

More generally, the succession of layers constituting the spar alternates a layer of the first type with a layer of the second type.

Furthermore, the layers may present greater or lesser densities of fibers and may stop at any position along the span of the blade as a function of the stiffness and centering requirements of the blade.

The spar 40 then transmits centrifugal, flapping, drag, and twisting forces respectively to the hub of the rotor.

The centrifugal forces are taken up by the longitudinal fibers of the second type that exert traction on the end portion 45 of the spar 40 along arrow F2.

In turn, this end wall 45 exerts pressure on the attachment filler 1 that acts by compressing the fastener pins in order to transmit centrifugal forces to the hub.

It should be observed that the longitudinal fibers of the second type are nevertheless cut at the root when an operator makes the holes 46' and 46". Nevertheless, and surprisingly, the resulting loss of strength is not sufficient to prevent centrifugal forces being taken up.

Similarly, flapping forces are transmitted by the fibers of the second type to the attachment filler and consequently to the hub, while drag and twisting forces are transmitted by fibers of the first type.

Naturally, the present invention can be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, the figures show a spar 40 provided with vertical passages in order to receive fastener pins that are disposed vertically, i.e. substantially parallel to gravity.

Nevertheless, it is possible to modify the spar 40 by piercing its front and rear portions 41 and 42, and also the front and rear faces 4 and 5 of the attachment filler 1 so as to make horizontal fastening possible.

Furthermore, the second shaft can be fastened in a balancing device of the blade. Consequently, when the second support shaft is removed, at the end of step c) for example, the balancing device closes the spar.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of fabricating a rotorcraft blade provided with a rigid attachment filler (1) and with a spar (40) that extends along the span of the blade from a root (51) of the blade to a free end (52) of the blade, said attachment filler (1) having top, bottom, front, rear, left side, and right side faces (2, 3, 4, 5, 7, and 6), wherein said spar (40) includes a succession of fiber layers (31, 32, 33) that hold said attachment filler (1) captive at the root (51) of said blade, said spar (40) being secured to said top, bottom, front, rear, and left side faces (2, 3, 4, 5 and 7) of said attachment filler (1), the method comprising the following steps in particular and in succession:

a) securing a first support shaft (8) to a rigid attachment filler (1) of the blade that is reversibly fastened to a mandrel (20);

b) placing fibers around said attachment filler (1) and said mandrel (20) in order to fabricate a spar of said blade, said spar (40) then including a succession of fiber layers (31, 32, 33) that hold said attachment filler (1) captive at the root (51) of said blade; and c) removing said first shaft (8) after the spar has polymerized.

2. A fabrication method according to claim 1, wherein step c) further comprises cutting off the distal end (47) of the resulting spar (40), i.e. the distal end (47) of the spar (40) that is remote from said attachment filler (1), in order to remove said mandrel (20).

3. A fabrication method according to claim 1, wherein a portion (8') of the first shaft (8) projects from the attachment filler (1) at the end of step c), and the first shaft is removed, the method further comprising cutting through the fibers that were covering said projecting portion (8').

4. A method according to claim 1, wherein step d) further comprises piercing the spar (40) through the attachment filler (1) in order to pass at least one pin for fastening the blade to a rotor hub.

5. A method according to claim 4, further comprising forming at least one orifice (9', 9") in the attachment filler prior to step a), so as to be in register with the piercing (46', 46") performed during step d).

6. A fabrication method according to claim 1, wherein the mandrel (20) has a rigid core (21) surrounded by a meltable zone (22) covered in an inflatable bag (23), the method further comprising intermediate step b') destroying said meltable zone (22) at least in part so as to be able to remove the mandrel (20) subsequently, step b') between steps b) and c).

7. A fabrication method according to claim 1, wherein step a) further comprises securing said mandrel (20) to a second support shaft (10).

8. A fabrication method according to claim 7 further comprising securing the first and second support shafts (8, 10) to each other and constituting a single common support shaft.

* * * * *